Dec. 24, 1957     T. J. ZELLER     2,817,144
METHOD OF ATTACHING CEMENTED CARBIDE FACINGS
ON VALVE LIFTERS AND THE LIKE
Filed May 25, 1953

INVENTOR.
THEODORE J. ZELLER
BY
HIS ATTORNEYS.

United States Patent Office 2,817,144
Patented Dec. 24, 1957

2,817,144

METHOD OF ATTACHING CEMENTED CARBIDE FACINGS ON VALVE LIFTERS AND THE LIKE

Theodore J. Zeller, Allentown, Pa., assignor, by mesne assignments, to Mack Trucks, Inc., a corporation of New York Application May 25, 1953, Serial No. 357,118

2 Claims. (Cl. 29—480)

This invention relates to methods of securing cemented carbide wearing surfaces on articles and to the resulting articles, and it relates more particularly to methods of attaching cemented carbide faces to valve tappets for internal combustion engines and to the resulting valve tappets.

This is a continuation-in-part of my application Serial No. 291,482, filed June 3, 1952 (now abandoned).

It has been recognized that the tappets of internal combustion engines are subjected to very severe wear because of violent impact and rubbing contact between the cams and the tappets during operation. Because of the rapid wearing of the tappets, it has been customary to provide adjusting mechanisms for taking up the play or "lash" in the valve system or even to include mechanical or hydraulic compensators for wear, expansion and contraction of the tappets and other valve actuating mechanisms.

In order to overcome the wear on such tappets, attempts have been made to secure abrasion-resistant facings to the cam-engaging surfaces of the tappets, such as, for example, cemented carbide facings. The use of cemented carbide, such as tungsten or other carbide, has, however, not been successful for the reason that such facings cannot be bonded to the body of the tappet by the prior brazing techniques in such a manner as to withstand the severe operating conditions to which the tappets are subjected, for any substantial period of time.

The difficulties appear to have been twofold. One difficulty is that it has not been possible to obtain a continuous uniform layer of the brazing metal between the tappet body and the cemented carbide facing by conventional brazing techniques. Despite the most careful control of operating conditions, voids occur in the bond and, as a result, weak points are left at which fracture and separation of the carbide facing occurs. Second, I have discovered that during the cooling of the tappet and the facing following a brazing operation, the different thermal coefficients of expansion of the tappet body, the carbide facing and the brazing metal have set up stresses in the facing which may be as much as 70% of the total stress resistance of the facing. As a result, when the facing is subjected to impact, it quickly fractures and separates from the tappet body.

The present invention involves a unique method of brazing the carbide facing to the tappet which assures a uniform and continuous bond between the facing and the tappet and also involves further treatment to relieve the facing of stresses set up during the brazing operation and cooling of the tappet, after brazing.

More particularly, the brazing operation includes the step of melting a slug of brazing metal in such a relation to the tappet body and the carbide facing that the brazing metal flows outwardly between the tappet and the carbide facing to produce a continuous bonding layer throughout the entire opposing areas of the carbide facing and the tappet body. The new brazing method eliminates voids or discontinuities in the bonding layer and produces a strong and uniform bond between the facing and the tappet body.

Inasmuch as the brazing operation is conducted at high temperature, the cooling of the tappet will set up stresses in the carbide facing (it having a lower thermal coefficient of expansion than the brazing metal or steel) so that the facing has a tendency to bow or buckle and become slightly convex. The convexity of the facing is an indication of internal stresses set up in the facing. These stresses must be eliminated in order to give the facing a long operating life. I have found that inasmuch as brazing metals, such as, copper and silver brazing metals, are relatively ductile at room temperature, the facing can be restored to its originally flat condition by coining it, thereby relieving the carbide facing of the major portion of the stresses set up in it during cooling. To further protect and secure the facing to the tappet, a shroud may be provided which extends around the edge of the tappet head and the edge of the facing and is bonded to both of them by the brazing metal.

The resulting tappets have operating lives far in excess of any heretofore produced and they are so effective and wear resistant that in many types of engines, the carbide faced tappets may replace hydraulic valve actuators and the like and without involving frequent adjustments of the required valve clearances.

For a better understanding of the present invention, reference may be had to the accompanying drawing in which.

Figure 1:
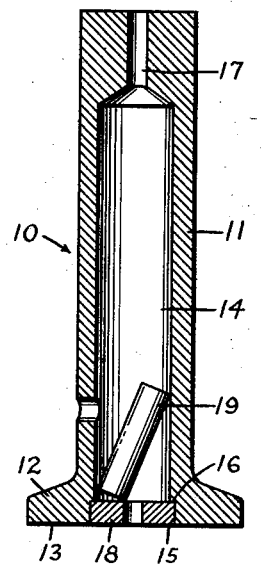
Fig. 1 is a view in longitudinal section through a valve tappet in partially completed form illustrating one step of the method embodying the present invention.

The invention will be described with reference to manufacture of valve tappet, such as is used in an internal combustion engine. It will be understood, however, that the method described hereinafter can be used for the manufacture of other articles in which a hard, wear-resisting surface of cemented carbide is advantageous. Referring now to Fig. 1 of the drawing, it shows a typical valve tappet body 10 formed of steel or the like. The tappet body 10 includes a stem 11 and a head 12 which may be of disc-like formation having a substantially flat outer face 13. The stem 11 has a central bore 14 which is in alignment with a somewhat larger bore or recess 15 in the face 13 of the head 12 providing a shoulder 16 at the junction of the bores. The opposite end of the stem has a smaller bore 17 therein which communicates with the larger bore 14. The recess 15 receives a perforated disc 18 formed of steel or the like. The disc has a press fit in the bore 15.

Figure 2:
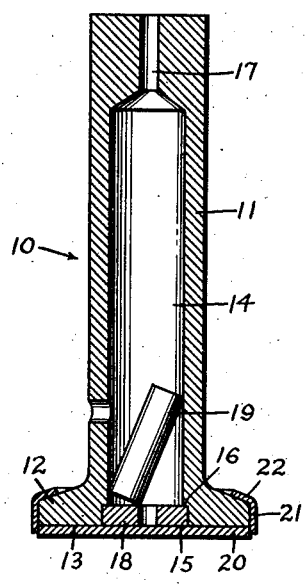
Fig. 2 is a view in longitudinal section through a valve tappet disclosing the assembled tappet and facing at another stage of the method.
Figure 3:
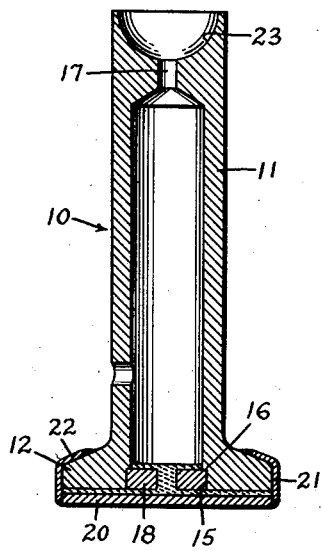
Fig. 3 is a view in section through a completed tappet embodying the present invention.

Starting with the tappet body 10, a slug 19 of brazing copper rod or wire or other brazing metal is introduced into the bore 14 and the disc 18 is then pressed into the bore 15 to retain the slug in the stem. All of the parts are degreased, for example, in a vapor degreasing apparatus of known type. The face 13 of the tappet is then machined flat without the use of a lubricant. The tappet body is now in a condition to receive a cemented carbide facing 20 which, as illustrated to Fig. 2, may consist of a flat disc of tungsten carbide of about the same dimensions as the face 13 of the tappet body. In preparing the disc for attachment to the valve body, it is grit blasted on one surface with a silicon carbide grit about No. 60 in size, in order to slightly roughen the back surface of the disc. The disc is then degreased in a vapor degreaser and the roughened surface of the disc 20 is then placed against the face 13 of the tappet body where it is held in position by means of the shroud 21. The shroud 21 consists of a thin steel ring having an in-turned flange 22 which bears against the back surface of the head 12 of the tappet. The opposite edge of the ring 21 at least partially overlies the edge of the carbide facing disc 20. The edge of the shroud overlying the edge of the disc may be spun in at about an angle of about 8° to engage the edge of the disc 20 and hold the latter lightly against the face 13 of the tappet body.

The facing disc 20 is bonded to the tappet body 10 in the following manner. The assembled tappet body 10, shroud 21 and facing disc 20 are placed in a furnace with the stem upright and the assembly resting on the disc 20. The temperature of the furnace is raised to above the melting point of the copper slug and the brazing operation is conducted in an atmosphere of dry hydrogen or other reducing gas to prevent oxidation of the copper and the steel. A temperature of 2,100° F. has been found satisfactory for the brazing operation. At the brazing temperature, the copper slug melts and flows out through the hole in the retaining disc or plug 18 and flows radially outwardly between the face 13 of the tappet body and the adjacent face of the carbide disc. Also, due to capillary attraction, the copper will flow outwardly between the edge of the disc 20 and the shroud 21 and upwardly and downwardly between the shroud and the edge of the disc 20 and back of the valve head 12. Heating of the assembly is continued for sufficient time to produce a continuous fillet of copper around each edge of the shroud 21, thereby showing that the copper has formed a continuous layer of film between the opposing faces of the valve body and the carbide disc and also between the shroud, the disc and the valve body. When the desired continuous film has been formed, the tappet is transferred to a cooling zone of the furnace and cooled to 400° F. and then removed from the furnace. The valve tappet is then allowed to cool to room temperature and the outer surface of the facing disc 20 is then checked for flatness. Ordinarily, it will be found that the face of the facing disc 20 is slightly convex due to greater shrinkage of the copper and steel than of the facing disc during cooling, due to their different thermal coefficients of expansion. If the tappet were use in this condition, the carbide facing would not stand up under the service conditions encountered in tappet operation because the stresses set up therein by differential shrinkage may amount to as much as 70% of the entire strength of the disc. This undesirable stress condition can, however, be overcome by subjecting the tappet and the disc to a coining or pressing operation to flatten the disc. This can be accomplished because the copper layer between the tappet body and the carbide disc is ductile at room temperature and will flow and allow the disc to be coined into the desired substantially stress-free, flat condition.

The copper acts not only to braze or bond the disc to the face of the tappet head 12, but it also forms a strong mechanical bond extending into the body of the tappet itself. When the copper freezes during cooling, some of it will freeze within the tappet stem and within the hole in the disc 18, so that a strong, rigid mechanical connection between these elements and the facing 20 is obtained.

At the conclusion of the brazing operation, the tappet may be hardened as required and the cup 23 for receiving the ball end of a push rod may be machined in the stem 11. Also, the stem of the tappet may be ground to within the required tolerances and the edge of the carbide face rounded or beveled.

Figure 4:
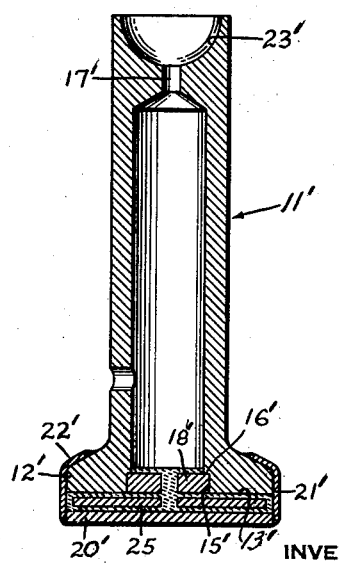
Fig. 4 is a view in section through a tappet in which the bond between the facing and the tappet body is modified to render it more plastic to relieve stress therein.

The thickness of the copper layer between body and the carbide disc is about .002 to .003 inch, so that the plasticity of such a thin layer, in some cases, may produce difficulties in flattening the carbide facing. To overcome this difficulty, as shown in Fig. 4 in which corresponding parts of the tappet are identified by primed reference characters, a thin disc or ring 25 of a metal of high ductility and with a melting point above the melting point of the brazing metal may be introduced between the face 13' of the tappet body 10' and the carbide facing 20', before brazing. The disc or ring 25 may be formed of ductile steel or "constantan" (a commercially available alloy of 40% nickel and 60% copper, commonly used in thermocouples). The disc or ring may be of slightly smaller diameter than the carbide facing and is about .010 inch thick. The disc or ring 25 is brazed into the bond between the facing 20' and the tappet face 13' and due to its presence, increases the plasticity or ductility of the bond sufficiently to enable the facing to be coined sufficiently to relieve it of stresses.

The resulting valve tappets, under test, have shown little or no wear when subjected to normal operating conditions in an internal combustion engine over long periods of time and failure or fracture of the carbide facing has been entirely eliminated because of the strong bond between the facing and the valve head, as well as the lack of stresses in the facing itself.

While the invention has been described with reference to valve tappets in which it has especially great utility, it will be understood that the method may be used with equally good results to secure carbide facings to, and wear resisting inlays in, other articles which are subjected to abrasion and impact. Therefore, the method and the article described herein should be considered as illustrative and not as limiting the scope of the following claims.

I claim:

1. A method of securing a cemented carbide facing on a surface of a metallic article comprising introducing a piece of brazing metal into a recess located substantially centrally of a surface of the article to which a cemented carbide facing is to be secured, placing a disc of a ductile metal having a melting point higher than said brazing metal on top of said facing, placing said article on top of said disc with said surface of the article resting on said disc, securing said facing to said article with a metallic shroud extending around the surface and said facing, heating the article and said facing to a temperature above the melting point of said brazing metal to melt the latter for flow out of said recess between said surface, said disc, said facing and said shroud, throughout their entire confronting areas, cooling them, to solidify said brazing metal and bond said facing, said article, said disc and said shroud together, and coining the facing after cooling it, to flatten and relieve it of stresses imposed thereon by the different thermal co-efficients of expansion of said article, disc, brazing metal and facing.

2. A method of securing a cemented carbide facing on a valve tappet having a hollow cylindrical stem and an enlarged head of circular outline, said head having a flat outer face and a centrally located opening communicating with said stem, comprising introducing a piece of brazing metal into said stem, placing a disc of a ductile metal having a melting point higher than said brazing metal on top of said facing, placing said tappet on top of said disc with said flat outer face resting on said disc, securing said facing to said tappet with a metallic shroud extending around the head and said facing, heating the tappet and said facing to a temperature above the melting point of said brazing metal to melt the latter for flow out of said stem between said flat outer face, said disc, said facing and said shroud, throughout their entire confronting areas, cooling them to solidify said brazing metal and bond said facing, said tappet, said disc and said shroud together, and coining the facing, after cooling, to flatten it and relieve it of stresses imposed thereon by the different coefficients of expansion of said head, disc, brazing metal and facing.

(References on following page)

References Cited in the file of this patent

UNITED STATES PATENTS

| | | |
|---|---|---|
| 1,247,366 | Brockway | Nov. 20, 1917 |
| 1,551,948 | Germonprez | Sept. 1, 1925 |
| 1,649,409 | Jardine | Nov. 15, 1927 |
| 1,801,171 | Mueller | Apr. 14, 1931 |
| 1,964,972 | Binns | July 3, 1934 |
| 2,178,527 | Wellman | Oct. 31, 1939 |
| 2,401,006 | Longoria | May 28, 1946 |
| 2,424,557 | DeBra | July 29, 1947 |
| 2,432,761 | Hoern | Dec. 16, 1947 |
| 2,448,907 | Ost | Sept. 7, 1948 |
| 2,474,643 | Webb | June 28, 1949 |
| 2,508,466 | Brace et al. | May 23, 1950 |

OTHER REFERENCES

Machine, Shop Practice Mar. 1952, "The Present Status of Cemented Tungsten Carbide Tools and Dies," by Zay Jefferies pp. 29–37.

Metal Progress, vol. 43, Feb. 1943, pp. 209–215 and 270.